March 12, 1957 R. COVER 2,784,842
CUT CORN DE-SILKING APPARATUS
Filed March 19, 1953 2 Sheets-Sheet 1
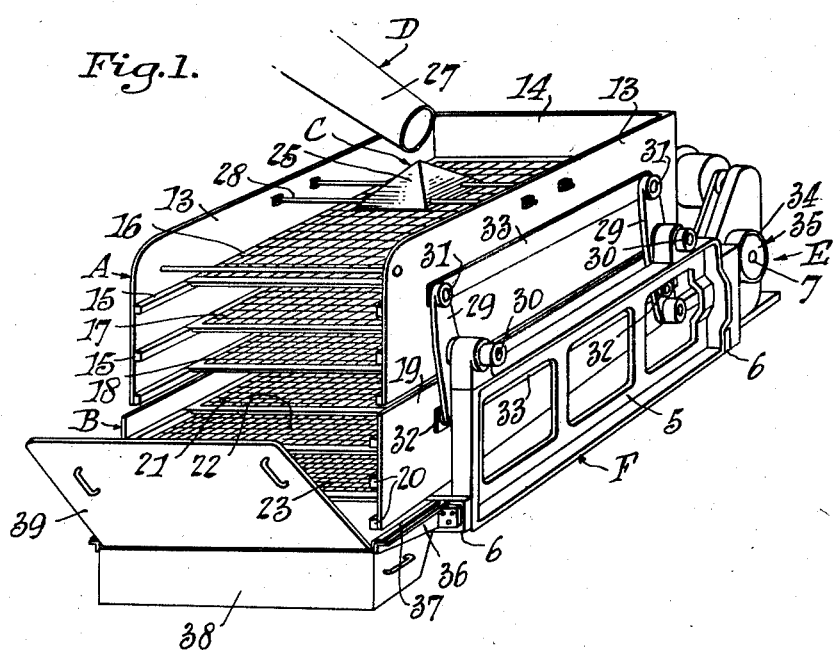
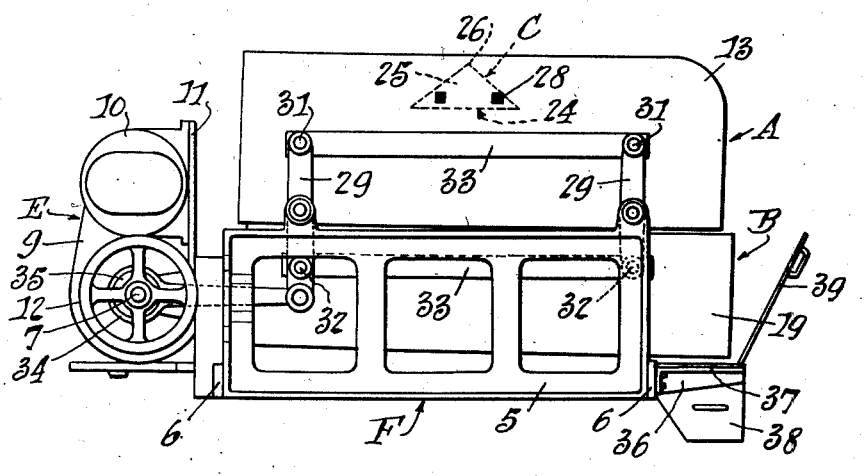
INVENTOR.
Ralph Cover.
BY
Mason, Porter, Diller & Stewart
ATTORNEYS March 12, 1957     R. COVER     2,784,842
CUT CORN DE-SILKING APPARATUS
Filed March 19, 1953     2 Sheets-Sheet 2
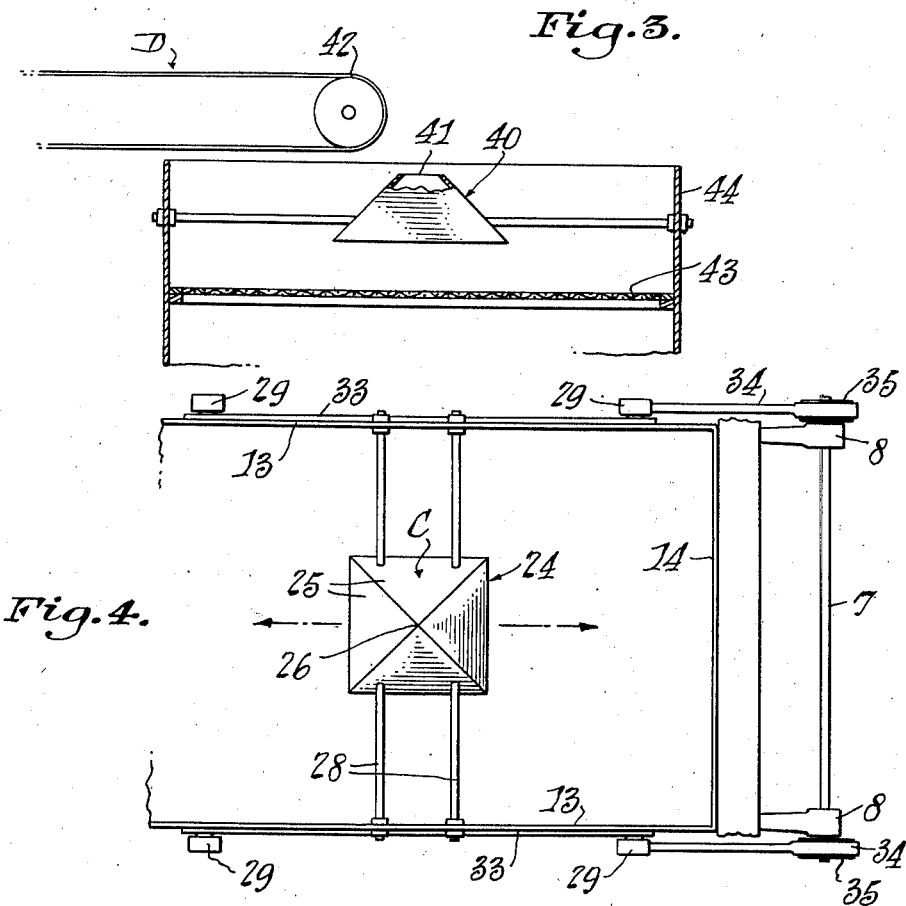
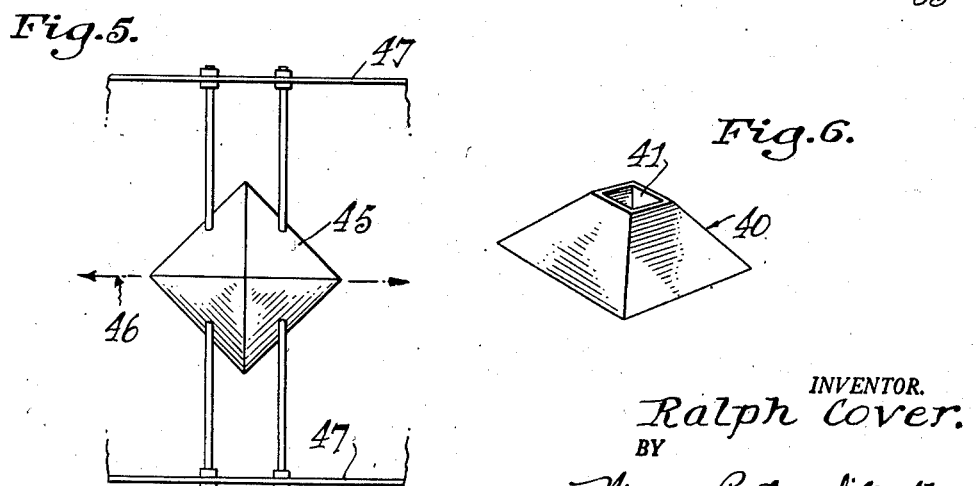
INVENTOR.
Ralph Cover.
BY
ATTORNEYS

United States Patent Office 2,784,842
Patented Mar. 12, 1957

2,784,842

CUT CORN DE-SILKING APPARATUS

Ralph Cover, Westminster, Md.

Application March 19, 1953, Serial No. 343,337

2 Claims. (Cl. 209—254)

The invention relates generally to the art of processing corn and primarily seeks to provide a novel apparatus for removing the silk from cut corn.

It is known that by passing cut corn through screens it is possible not only to effectively remove pieces of cobs, husks and other debris, but also to remove the corn silk, the latter looping over and adhering to the screen mesh and being retained thereby as the clean corn falls through. However, known screening apparatus of this character has not been entirely satisfactory because of the frequent fouling or clogging of the screens and the necessity of frequent shut downs for screen cleaning purposes. I have found that this problem is due largely to localized delivery of the corn onto the screen so that the receiving and retention of the silk over a relatively small area results in unnecessarily rapid fouling or clogging of the screen. This clogging action is aggravated as the starch content in the corn increases. It is a purpose of the present invention to provide a novel cut corn de-silking apparatus in which provision is made not only for efficiently screening and de-silking the cut corn, but also for initially diverting or distributing the corn onto the screen from the corn feeding means in a novel manner for minimizing the clogging action and so distributing the clogging tendency as to assure efficient use of the apparatus over much longer periods than would normally be possible without cleaning of the screens.

An object of the invention is to provide a novel apparatus of the character stated wherein are included a screen element disposed in a generally horizontal position, a diverter element spaced above the screen element and having a base portion dimensioned to overlie a substantial area at a generally central portion of the screen element and having wall portions converging upwardly and inwardly from the base portion, and means for delivering cut corn onto the diverter element to be distributed thereby over the screen element.

Another object of the invention is to provide an apparatus of the character stated wherein there is included means for reciprocating at least one of the screen and diverter elements in a generally horizontal direction so as to facilitate distribution of the corn over screen portions outwardly of the diverter and also at least partially under the diverter.

Another object of the invention is to provide an apparatus of the character stated wherein the diverter is reciprocated and is in the form of a pyramid disposed with two of its base side edges in parallel relation to the direction of reciprocation so that two side wall portions of the pyramid will divert corn laterally as it is deposited thereon, and the two remaining wall portions will both divert and actively throw the corn deposited thereon endwise or in the direction of reciprocation.

Another object of the invention is to provide an apparatus of the character stated wherein the diverter is reciprocable and is in the form of a pyramid disposed so that an imaginary line passing through two corners of the pyramid base will lie in the direction of reciprocation and each of the four converging pyramid side wall portions will bear angular relation to the line of reciprocation and be effective to both divert and actively throw the corn deposited thereon laterally and endwise.

Another object of the invention is to provide an apparatus of the character stated wherein the diverter is provided with an aperture at its apex effective to permit the falling through of some cut corn directly onto the screen.

Another object of the invention is to provide apparatus of the character stated wherein there are included an upper bank of superposed generally horizontal screens, a lower bank of superposed generally horizontal screens, means for individually reciprocating the screen banks in a generally horizontal direction, a diverter spaced above the uppermost screen in the upper bank and having a base portion dimensioned to overlie a substantial area at a generally central portion of said uppermost screen and having wall portions converging upwardly and inwardly from said base portion, and means for delivering cut corn onto the diverter to be distributed thereby over said uppermost screen.

Another object of the invention is to provide an apparatus of the character stated wherein the diverter is mounted directly on the upper screen bank so as to be reciprocable therewith.

With the above and other objects in view that will hereinafter appear, the nature of the invention will be more clearly understood by reference to the following detailed description, the appended claims and the several views illustrated in the accompanying drawings.

In the drawings:

Figure 1 is a perspective view illustrating the invention set up for the de-silking of cut corn of the cream style.

Figure 2 is a side elevation of the apparatus looking at the side opposite that shown in Figure 1.

Figure 3 is an enlarged fragmentary vertical cross section illustrating a modified arrangement of the invention in which the apparatus is adapted for de-silking cut corn of the whole kernel type.

Figure 4 is a diagrammatic plan view illustrating the arrangement of the diverter shown in Figure 1.

Figure 5 is a view similar to Figure 4 illustrating a modified arrangement of the diverter.

Figure 6 is a detail perspective view illustrating the form of diverter shown in Figure 3.

In the example of embodiment of the invention herein disclosed, the improved apparatus includes an upper screen bank A, a lower screen bank B, a diverter C mounted on and movable with the upper screen bank, means D for forwarding cut corn onto the diverter, and means E for individually reciprocating the screen banks. All of these parts may be mounted on a suitable supporting frame structure F.

The frame structure includes side members or castings 5 which are connected in parallel spaced relation by traversing members 6. A transverse power shaft 7 is provided and is rotatably supported in bearing brackets 8 mounted on the frame structure. Rotation is imparted to the shaft through suitable power transmitting connections housed as at 9, from a driving motor 10 which is suitably supported as at 11 on the frame structure. A hand wheel 12 may be secured on the shaft 7 to permit hand turning thereof for testing purposes.

The upper screen bank A includes a housing composed of side members 13 and a connecting back member 14, said side members having thereon three sets of supporting guides 15 whereon are removably supported an upper screen 16, an intermediate screen 17 and a lower screen 18. The lower screen bank B similarly includes connected side members 19 having supporting guides 20 whereon are removably supported an upper screen 21, an intermediate screen 22 and a lower screen 23. In one arrangement of screens found acceptable and efficient for the de-silking purpose the uppermost screen 16 may be a one inch mesh screen. The intermediate upper screen 17 may have a three-fourths inch mesh, and the lowermost screen 18 of the upper bank may have a five-eighths inch mesh. The upper screen 21 of the lower bank may also have a five-eighths inch mesh, and the intermediate and lower screens 22 and 23 of this bank may have a one-half inch mesh.

The diverter C preferably takes the form of a pyramid with a square base edge 24 and sides 25 which converge upwardly and inwardly to the apex terminus 26, and onto this diverter the cut corn is deposited for being efficiently distributed over the uppermost screen 16. When the apparatus is being used for de-silking cut corn of cream style, the corn is delivered onto the diverter through a spout or chute 27 in the manner illustrated in Figure 1. It will be noted that the pyramid diverter is rigidly secured by rods 28 to the sides 19 of the upper bank housing with the base of the pyramid spaced above the uppermost screen 16. While the sizes of the screens and the diverter may be varied to suit various operating conditions, it has been found very practical to provide screens approximating 23 by 36 inches, and a diverter having base edges approximating nine inches at each side and spaced three inches above the underlying screen.

Other than the shaft 7 and the motor 10 the reciprocating means comprises a pair of supporting uprights 29 disposed at each side of the upper and lower bank housings and between the same and the respective frame sides, said uprights being rockably supported intermediately of their upper and lower ends as at 30 on the respective frame side. The supporting uprights 29 have their upper ends pivoted as at 31 to the upper bank, and their lower ends pivoted at 32 to the lower bank, in each instance through a reinforcing link 33. One of the uprights 29 adjacent the power shaft 7 is connected by a strap 34 with an eccentric 35 secured on said shaft so that when the shaft is rotated, rocking motion will be imparted to the uprights 29, and reciprocation, in a generally horizontal direction, and individually, to the upper and lower screen banks.

Brackets 36 are secured to the frame structure below the open ends of the upper and lower screen banks, as shown in Figure 1, and these brackets serve as supports for the outwardly turned flanges 37 on the screenings catcher box 38. It is to be understood that the screens are arranged on a slight incline so as to deliver cob and husk bits endwise out of the open ends of the housings into the catcher box 38. The box may include a hinged lid 39 which may be positioned as shown in Figure 1 to aid in directing the screenings into the box.

In the modified showing in Figure 3 the diverter 40 is provided with an aperture 41 at its apex through which corn delivered from the conveyor feeder 42 can fall directly onto the uppermost screen 43 of the upper bank 44.

In the modified showing in Figure 5, the diverter 45 is placed to present the converging wall portions thereof in angular relation to the center line of the screen instead of in parallel relation thereto as in Figure 4. It will be noted that in this arrangement an imaginary line 46 passing through two corners at the base of the diverter will be in the line of reciprocation or parallel the bank sides 47.

It will be apparent that when cut corn is deposited on diverters of the form shown in Figures 1, 3, 4 and 5, it will be distributed over a wide portion of the uppermost screen, and reciprocation of the diverter will cause converging wall portions of the diverter which traverse the line of reciprocation, either in perpendicular relation, or in angular relation thereto, not only to divert the corn but also to actively throw the same so as to additionally facilitate distribution thereof over the screen. In the arrangement shown in Figures 1 and 4 only the two sides of the pyramid perpendicularly traversing the line of reciprocation will actively throw the corn, but in the angular arrangement of the pyramid shown in Figure 5 all sides or wall portions of the pyramid will serve not only to distribute the corn by mere diversion, but also by an active throwing action.

It will also be apparent that the spacing of the pyramid above the uppermost screen, in combination with the agitation or reciprocation, will assure that some of the cut corn will find its way onto the screen area under the pyramid, and this distribution of cut corn under the pyramid can be facilitated by the formation of the aperture 41 in the apex of the diverter as shown in Figures 3 and 6. The provision of this apex aperture permitting some of the cut corn to fall directly onto the screen area underlying the diverter will be found particularly effective when the apparatus is being used for de-silking cut corn of the whole kernel style.

While it is preferred that a polygonal structure in the form of a pyramid be used as a diverter, it is to be understood that a coniform diverter can be employed if desired.

In the operation of the apparatus the cut corn deposited on the diverter and distributed thereby over the uppermost screen will be agitated on the screen and fall down successively through the screens into a receiver, the corn silk looping over and being retained on the screens, and the bits of cobs, husks and other debris gradually passing off the free ends of the screens into the catcher box 38. By thus efficiently distributing the cut corn over the uppermost screen, gumming up and clogging of a localized area of the screen is avoided and the apparatus can be used over a much longer period than has been possible heretofore.

It will be apparent that because of the pivotal mounting of the upper and lower screen banks on the upper and lower ends of the uprights 29 the screens will be reciprocated in a generally horizontal direction, and this generally horizontal shaking action will naturally include a certain amount of rising and falling action of the screens because of the relatively short lengths of the upright portions between the rocking centers 30 and the upper and lower bank connecting pivots 31 and 32.

While examples of acceptable structure are disclosed herein, it is to be understood that the structural features and arrangements of parts may be variously changed without departing from the spirit and scope of the invention as defined in the appended claims.

I claim:

1. In cut corn de-silking apparatus, the combination of a screen element disposed in a generally horizontal position, a diverter element spaced above and from all sides of said screen element and having a base portion dimensioned to overlie a substantial area at a generally central portion of the screen element and having wall portions converging upwardly and inwardly from at least three sides of said base portion, and means for simultaneously reciprocating the screen element and the diverter element in a generally horizontal direction, said diverter being generally in pyramid form presenting a rectangular generally horizontally disposed and downwardly directed base and flat sides and being arranged so that an imaginary line passing through two corners of the rectangular base will lie in the direction of reciprocation.

2. In cut corn de-silking apparatus, the combination of a screen element disposed in a generally horizontal position, a diverter element spaced above and from all sides of said screen element and having a base portion dimensioned to overlie a substantial area at a generally central portion of the screen element and having wall portions converging upwardly and inwardly from said base portion in at least three directions, stationary means for delivering cut corn onto the diverter element to be distributed thereby over said screen element, and means for imparting reciprocation in a generally horizontal plane to at least one of said elements, said diverter being generally in pyramid form presenting rectangular generally horizontally disposed and downwardly directed base and flat sides and being arranged so that an imaginary line passing through two corners of the rectangular base will lie in the direction of reciprocation.

References Cited in the file of this patent

UNITED STATES PATENTS

| | | |
|---|---|---|
| Re. 792 | Cummings | Aug. 16, 1859 |
| 310,181 | Case | Jan. 6, 1885 |
| 1,341,791 | Ek | June 1, 1920 |
| 1,645,568 | Woodward | Oct. 18, 1927 |
| 1,979,791 | Blackburn | Nov. 6, 1934 |

FOREIGN PATENTS

| | | |
|---|---|---|
| 618,267 | Germany | May 26, 1932 |